No. 720,020. PATENTED FEB. 10, 1903.
F. GRIMSHAW.
MEDICINAL BATTERY.
APPLICATION FILED JULY 10, 1901.
NO MODEL.

Witnesses
R. F. Lanza
C. G. L. McCord

Inventor
Fred Grimshaw
by H. L. Lord
Atty.

UNITED STATES PATENT OFFICE.

FRED GRIMSHAW, OF NORTHEAST, PENNSYLVANIA.

MEDICINAL BATTERY.

SPECIFICATION forming part of Letters Patent No. 720,020, dated February 10, 1903.

Application filed July 10, 1901. Serial No. 67,747. (No model.)

*To all whom it may concern:*

Be it known that I, FRED GRIMSHAW, a citizen of the United States, residing at Northeast, in the county of Erie and State of Pennsylvania, have invented certain new and useful Improvements in Medicinal Batteries; and I do hereby declare the following to be a full, clear, and exact description of the invention, such as will enable others skilled in the art to which it appertains to make and use the same.

This invention relates to medicinal batteries; and it consists in certain improvements in the construction thereof, as will be hereinafter described, and pointed out in the claims.

Figure 1:
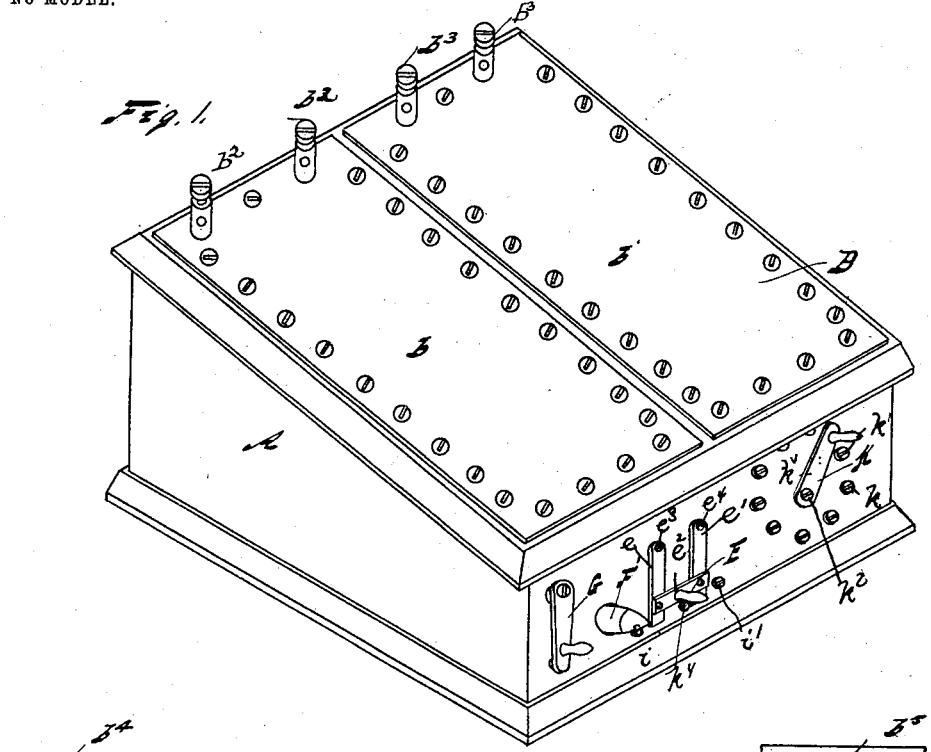
Figure 2:
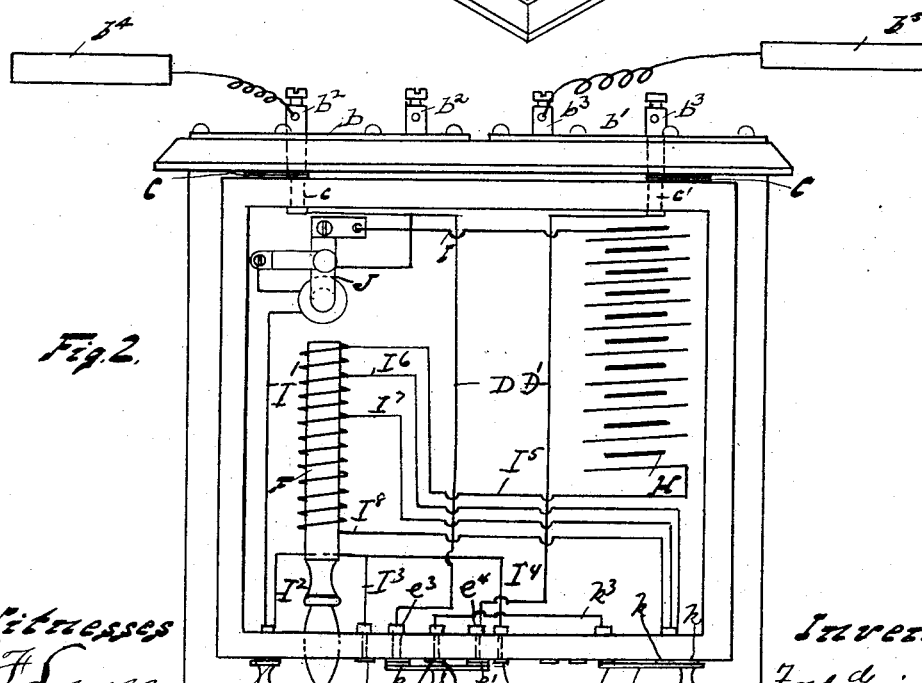

The invention is illustrated in the accompanying drawings, as follows:

Figure 1 is a perspective view of the apparatus with cover closed. Fig. 2 is a plan view, the cover being open to show the arrangement of parts.

More particularly the invention refers to a medicinal battery in which treatment may be applied by current through the feet, as well as the usual contacts in this class of battery. The usual parts of the medicinal battery are included in a box A, having a cover B, hinged to the box, preferably at a slight inclination to the bottom of the box, so as to make a convenient foot-rest. Arranged on the top of the box are the plates $b$ and $b'$. These are of sufficient size to make a convenient foot-rest and at the same time a large contact for the feet. They are insulated from each other by the cover of the box. At the upper ends of the plates are the contact-posts $b^2$ and $b^3$, to which the ordinary hand-contacts $b^4$ $b^5$ may be attached, if desired. These posts extend through the wooden cover and are secured to the hinges C C, with which the cover is secured to the box, forming an electrical connection between said hinges and the plates $b$ $b'$. The plates $b$ $b'$ form electrical connections between posts $b^2$ $b^3$, passing between the plates $b$ $b'$ and hinges $c$, and the other posts $b^2$ $b^3$, which may be arranged on said plate. As many additional binding-posts, such as $b^2$ $b^3$, may be provided as desired, and electrodes, such as $b^4$ $b^5$, may be connected with these. Extending from the inside of the box to the hinges are the posts $c$ $c'$. The posts $c$ $c'$ are connected with the pole-changer E, which is preferably at the outside and on the front of the box and performs its usual function. Arranged in the box is a coil F, having the adjuster F' therein, the make-and-break apparatus J, and the battery H. The coil is made in sections, different wires leading from the different sections to the rheostat K. All these parts perform their usual functions in the usual manner.

The circuits are completed as follows: The current passes from the battery H, by the wire I, through the make-and-break coil J, by the switch G, the wire $I^2$, to the wire $I^3$ or $I^4$, depending on which direction the current is to pass. Passing by the wire $I^3$, it passes to the contact $i$ of the pole-changer E. With the part $e$ of the pole-changer on the contact $i$ the current passes through the part $e$ by the post $e^3$, extending through the upper end of said part $e$, by the wire D, post $c$, hinge C, to the hand-contact $b^4$ or plate $b$, returning from the hand-contact $b^5$ or plate $b'$ by the post $b^3$, hinge C, post $c'$, wire D, to the post $e^4$, connected to the upper end of the part $e'$ of the pole-changer, passing through this part $e'$ to the post $k^4$, from the post $k^4$, by the wire $k^3$, to the post $k^2$. The post $k^2$ is connected by the arm $k'$ with one of the contacts $k$ of the rheostat, passing by the wire $I^6$, $I^7$, or $I^8$, depending upon the post $k$, with which the arm $k'$ is brought into contact, to the coil F, passing through the remainder of the coil, by the wire $I^5$, to the battery. Where the current passes by the wire $I^4$, the part $e'$ of the pole-changer is placed on the post $i'$ and the part $e$ on the post $k^4$, the current passing from the post $i'$ by the part $e'$, post $E^4$, by the wire $D^4$, and returning passes from the post $e^3$ to the part $e$ and post $k^4$ to the rheostat. It will be noticed that in this manner the direction of the current is changed.

My invention lies in the arrangement of the box forming a foot-rest and in the method of connecting the elements of the instrument to the cover and in the general arrangements of parts. It will be noted that the hinges not only perform the function of conveniently securing the cover, but also form an electrical connection between the plates and top of the cover and the battery.

What I claim as new is—

1. A medicinal battery comprising a box; an electric coil and a battery arranged within said box; a removable cover on said box; the plates, $b$, $b'$, arranged on the cover of said box and insulated from each other; and an electrical connection between said plates and the battery arranged to permit the opening of the cover without breaking said connection.

2. In a medicinal battery, the combination of a box; instruments within the box for producing a medicinal electrical supply; a cover hinged to the box; a foot-plate upon the top of the cover; and an electrical connection through the hinge between the plate on the cover and the electrical supply within the box.

3. In a medicinal battery, the combination of a box; means arranged to furnish a medicinal electric supply placed within the box; a cover hinged on the box; the plates, $b$, $b'$, arranged on the cover; a connection through the hinges between the plates, $b$, $b'$; and the means for furnishing the electrical supply.

4. In a medicinal battery, the combination of the box, A; the battery, H; coils, F; make-and-break apparatus, J; the adjuster, F; switch, G; pole-changer, E; rheostat, K; connections between said several electrical instruments through said switches, rheostat and pole-changer; the cover, B; hinges, C, securing the cover to the box; the plates, $b$, $b'$, on the cover and insulated from each other by the cover; the posts, $b^2$, $b^3$, connecting the plates with the hinges; and means for connecting the hinges with the battery within the box.

In testimony whereof I affix my signature in presence of two witnesses.

FRED GRIMSHAW.

Witnesses:
   D. R. CUSHMAN,
   H. E. NORRIS.